(12) United States Patent
Kasuga et al.

(10) Patent No.: US 10,578,954 B2
(45) Date of Patent: Mar. 3, 2020

(54) PROJECTOR CONFIGURED TO BE INTEGRATED WITH A SURFACE

(71) Applicant: SEIKO EPSON CORPORATION, Tokyo (JP)

(72) Inventors: Hirofumi Kasuga, Matsumoto (JP); Takeshi Ishikawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/212,869

(22) Filed: Dec. 7, 2018

(65) Prior Publication Data

US 2019/0107770 A1    Apr. 11, 2019

Related U.S. Application Data

(63) Continuation of application No. 15/451,545, filed on Mar. 7, 2017, now Pat. No. 10,185,208.

(30) Foreign Application Priority Data

Mar. 24, 2016    (JP) .................................. 2016-059679

(51) Int. Cl.
*G03B 21/14* (2006.01)
*F16H 35/18* (2006.01)
(Continued)

(52) U.S. Cl.
CPC ........... *G03B 21/145* (2013.01); *F16H 25/14* (2013.01); *F16H 35/18* (2013.01); *F16M 13/027* (2013.01)

(58) Field of Classification Search
CPC ....... G03B 21/145; G03B 21/14; F16H 25/14; F16H 35/18; F16M 13/02; F16M 13/027
See application file for complete search history.

(56) References Cited

U.S. PATENT DOCUMENTS

| 2014/0043516 | A1 | 2/2014 | Baker |
| 2015/0022785 | A1* | 1/2015 | Kinebuchi ............. F16M 11/00 353/52 |

(Continued)

FOREIGN PATENT DOCUMENTS

| JP | 2006-106078 A | 4/2006 |
| JP | 2006-227143 A | 8/2006 |

(Continued)

OTHER PUBLICATIONS

Nov. 8, 2017 Office Action issued in U.S. Appl. No. 15/451,545.
(Continued)

*Primary Examiner* — Cara E Rakowski
*Assistant Examiner* — Magda Cruz
(74) *Attorney, Agent, or Firm* — Oliff PLC

(57) ABSTRACT

A projector is configured to project an image to one side with respect to an installation surface. The projector includes: a housing that is configured to be fixed to the installation surface, a projection section that is built in the housing and configured to project image light from one end of the housing, an adjustment mechanism that is configured to adjust a posture of the projection section with respect to the installation surface, a drive section that is configured to drive the adjustment mechanism, and an operation detecting section configured to detect an input operation corresponding to the adjustment mechanism.

10 Claims, 8 Drawing Sheets

(51) Int. Cl.
*F16H 25/14* (2006.01)
*F16M 13/02* (2006.01)

(56) References Cited

U.S. PATENT DOCUMENTS

| | | |
|---|---|---|
| 2015/0212398 A1 | 7/2015 | Lam |
| 2016/0154290 A1* | 6/2016 | Brown ................ H04L 12/4625 359/275 |
| 2017/0280116 A1* | 9/2017 | Kinebuchi ........... G03B 21/145 |
| 2018/0059520 A1* | 3/2018 | Dubois ................. G03B 21/10 |

FOREIGN PATENT DOCUMENTS

| | | |
|---|---|---|
| JP | 2008-218148 A | 9/2008 |
| JP | 2009-048155 A | 3/2009 |

OTHER PUBLICATIONS

May 10, 2018 Office Action issued in U.S. Appl. No. 15/451,545.
Sep. 13, 2018 Notice of Allowance issued in U.S. Appl. No. 15/451,545.

* cited by examiner

PROJECTOR CONFIGURED TO BE INTEGRATED WITH A SURFACE

CROSS-REFERENCE TO RELATED APPLICATIONS

This application is a Continuation of U.S. application Ser. No. 15/451,545 filed Mar. 7, 2017, and is based on and claims benefit of priority from earlier Japanese Patent Application No. 2016-059679 filed Mar. 24, 2016, the description of which is incorporated herein by reference.

BACKGROUND

1. Technical Field

The present invention relates to a projector.

2. Related Art

In the related art, a display device that is installed in a ceiling or under a floor has been known (e.g., see JP-A-2009-48155). A display device disclosed in JP-A-2009-48155 includes a housing fixed in a ceiling space with volts, and changes, with a reflecting mirror, the optical path of video light projected from a main body section within the housing.

When a device such as a projector is installed in a ceiling space or the like, it is conceivable to fix the device with volts or the like, like the device disclosed in JP-A-2009-48155. In this case, the position or posture of the device is fixed in the installation state, so that it is not easy to adjust the position or posture after installation. For this reason, when the projector is installed in a ceiling or the like, it is not easy to adjust the projection state (the position or orientation of an image) of the projector.

SUMMARY

An advantage of some aspects of the invention is to provide a projector that can be installed in a ceiling or the like and can adjust a projection state after installation.

An aspect of the invention is directed to a projector that is attached to an opening provided in an installation surface and projects an image to one side with respect to the installation surface, the projector including: an exterior section exposed on the one side; a projection section that projects image light from a projection port formed in the exterior section to the one side; and an adjustment mechanism that adjusts a posture of the projection section with respect to the installation surface.

According to the aspect of the invention, since the posture of the projection section with respect to the installation surface can be adjusted in the state where the projector is attached to the installation surface, the projection state of the projector can be adjusted after the installation of the projector.

In the projector according to the aspect of the invention, the adjustment mechanism may rotate the projection section with an axis perpendicular to the installation surface being as an axis of rotation.

According to this configuration of the aspect of the invention, the orientation of the image projected by the projector can be adjusted by rotating the projection section with respect to the installation surface after the installation of the projector.

In the projector according to the aspect of the invention, the adjustment mechanism may include a support section that supports the projection section with respect to the exterior section, and a rotation adjustment mechanism that rotates the support section around an optical axis of the projection section.

According to this configuration of the aspect of the invention, the orientation of the image projected by the projector can be adjusted by rotating the projection section around the optical axis after the installation of the projector.

In the projector according to the aspect of the invention, the adjustment mechanism may adjust the inclination of the projection section with respect to the installation surface.

According to this configuration of the aspect of the invention, a direction in which the projector projects light, that is, a position where the image is projected can be adjusted by adjusting the inclination of the projection section with respect to the installation surface after the installation of the projector.

In the projector according to the aspect of the invention, the adjustment mechanism may include an inclination adjustment mechanism that displaces the one side of the projection section in a direction perpendicular to an optical axis of the projection section to thereby change the inclination of the optical axis of the projection section.

According to this configuration of the aspect of the invention, a direction in which the projector projects light, that is, a position where the image is projected can be adjusted by adjusting the inclination of the projection section after the installation of the projector.

In the projector according to the aspect of the invention, the projector may further include an operation element on the exterior section, and the adjustment mechanism may be coupled to the operation element disposed on the exterior section, and adjust the posture of the projection section with respect to the installation surface by an operation on the operation element.

According to this configuration of the aspect of the invention, the projection state of the projector can be adjusted by operating the operation element provided on the exterior section after the installation of the projector.

In the projector according to the aspect of the invention, the projector may further include a cover located on the one side of the operation element and covering the operation element, and the cover may include a transmission section through which the image light projected by the projection section passes.

According to this configuration of the aspect of the invention, an improvement in aesthetic appearance can be achieved by covering the operation element with the cover, and the operation element can be prevented from being unintentionally moved.

In the projector according to the aspect of the invention, the projector may further include: an operation detecting section that detects an operation on an operation device; a drive section that drives the adjustment mechanism; and a control section that causes the drive section to operate corresponding to the operation detected by the operation detecting section.

According to this configuration of the aspect of the invention, the projection state of the projector can be adjusted by the operation of the operation device after the installation of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
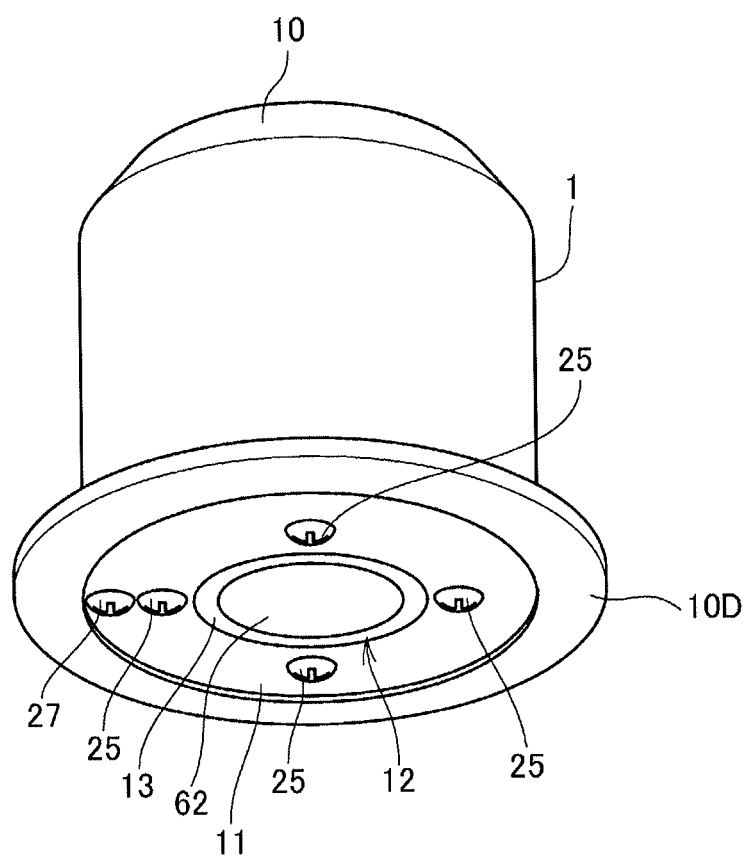
FIG. 1 is a perspective view of a projector according to a first embodiment.

FIG. 1 is a perspective view of a projector 1 according to a first embodiment to which the invention is applied.

The projector 1 is a projection-type display device that is embedded and installed in a ceiling surface, a wall surface, or the like, and projects (displays) an image by emitting image light.

The projector 1 is configured to accommodate parts in a housing 10 having a substantially cylindrical shape. The housing 10 of the embodiment has a cylindrical shape, and one end of the housing 10 is an opening. The peripheral edge of the opening of the housing 10 protrudes outward to constitute a flange section 10D.

An exterior panel 11 having a flat plate shape is fixed to the housing 10 so as to close the opening of the housing 10. The exterior panel 11 is a circular plate-like member. The exterior panel 11 is a panel that is exposed on the installation surface side, and corresponds to an exterior section according to the invention.

A circular projection port 12 is formed substantially in the center of the exterior panel 11 in order to allow light emitted by a projection section 70 (FIG. 4) built in the housing 10 to pass through the exterior panel 11. A disk-like elastic sheet 13 including a circular opening in the center is attached to the projection port 12. The frond end of a lens barrel 62 that constitutes the projection section 70 is exposed through the opening of the elastic sheet 13. The lens barrel 62 is moved by an inclination adjustment mechanism 50 (FIG. 4) as will be described later. The elastic sheet 13 has elasticity so that the elastic sheet 13 can be deformed following the movement of the lens barrel 62. For example, the elastic sheet 13 is formed of rubber, synthetic rubber, synthetic resin, or a composite material of these materials.

In the exterior panel 11, four inclination adjustment screws 25 are disposed along the circumferential direction, and further, one rotation adjustment screw 27 is installed. The inclination adjustment screw 25 is a screw for adjusting the inclination angle of the lens barrel 62 with respect to the housing 10, that is, a ceiling surface 82. The rotation adjustment screw 27 is a screw for making an adjustment to rotate the projection section 70 around the optical axis of the lens barrel 62 with respect to the housing 10, that is, the ceiling surface 82. The inclination adjustment screw 25 and the rotation adjustment screw 27 each correspond to an operation element according to the invention. The inclination adjustment screws 25 and the rotation adjustment screw 27 are rotatably supported to the exterior panel 11.

Figure 2:
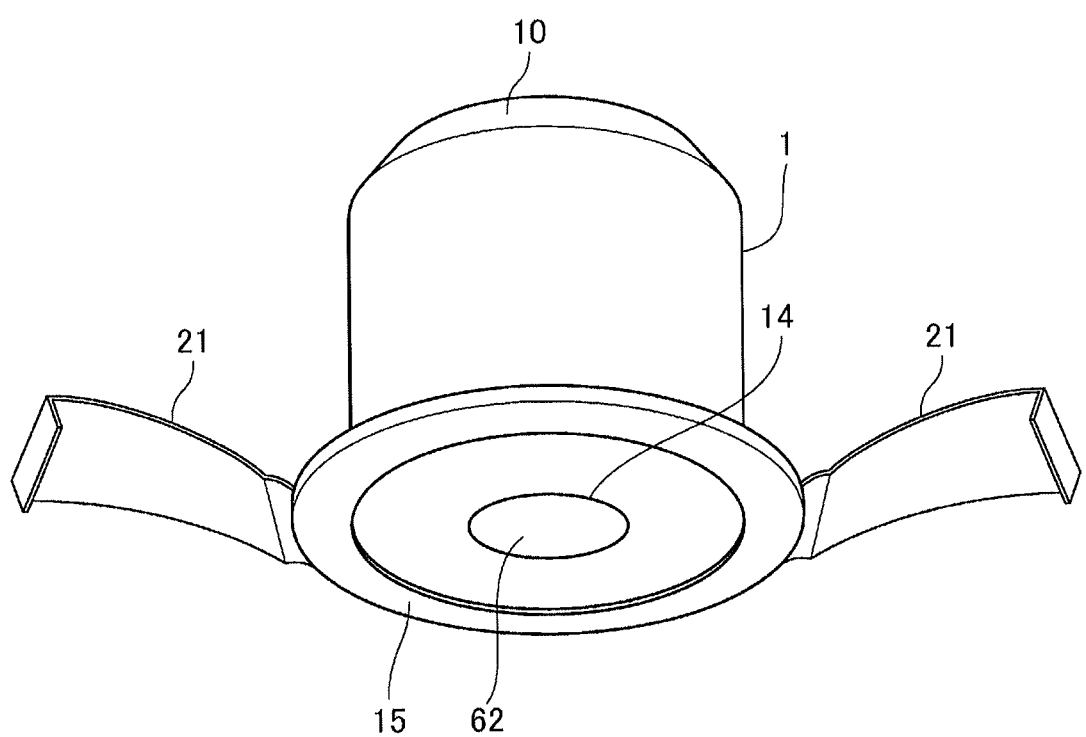
FIG. 2 is a perspective view of the projector.

FIG. 2 is a perspective view of the projector 1.

When the projector 1 is used, a pair of mounting springs 21 are mounted to the end or in the vicinity of the end of the housing 10 on the exterior panel 11 side as shown in FIG. 2. The mounting spring 21 is a plate-like spring made of metal or made of synthetic resin, and has elasticity.

A cover 15 that hides the exterior panel 11 may be mounted to the opening of the housing 10. The cover 15 is a disk made of synthetic resin or metal, and is placed on and fixed to, for example, the flange section 10D of the housing 10. A cover opening 14 is formed in the center of the cover 15 at a position corresponding to the projection port 12. The front end of the lens barrel 62 is disposed so as to face the cover opening 14, so that projection light can be projected through the cover opening 14. With the provision of the cover 15, an improvement in aesthetic appearance can be achieved by hiding the inclination adjustment screws 25 (FIG. 1) and the rotation adjustment screw 27 (FIG. 1) without blocking the projection light of a projection section main body 60 (FIG. 4) to be described later.

Figure 3:
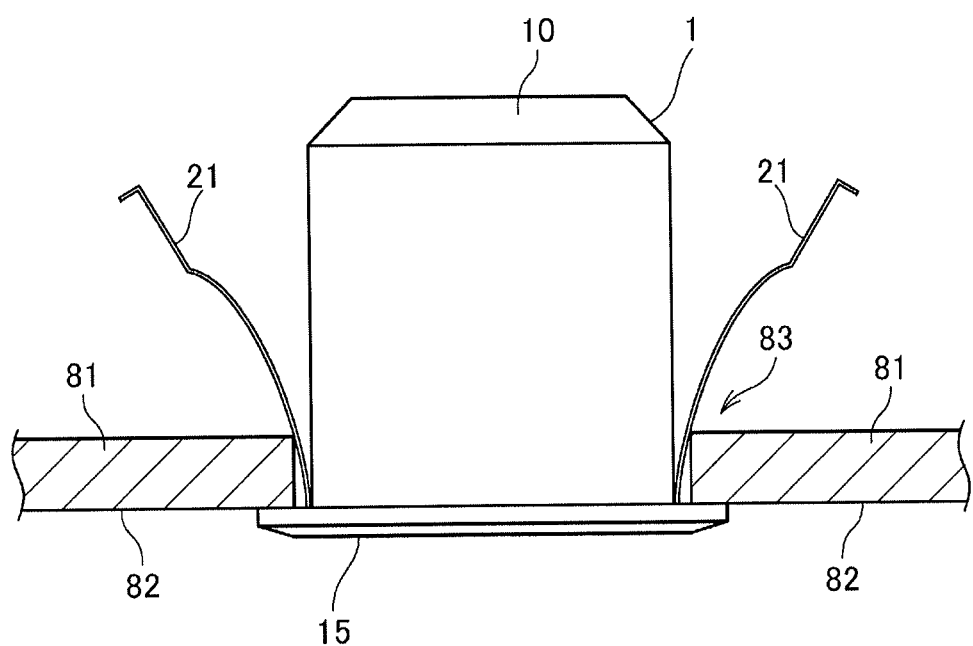
FIG. 3 is a side view showing the installation state of the projector.

FIG. 3 is a side view showing the installation state of the projector 1.

FIG. 3 shows an example in which the projector 1 is installed in a ceiling in an indoor space. The projector 1 is installed so as to be fitted into a ceiling opening 83 (opening) that is drilled through a ceiling board 81. Reference numeral 82 shown in the drawing indicates a ceiling surface (installation surface) that is a surface of the ceiling board 81 on the room space side.

The ceiling board 81 is, for example, aboard of wood, metal, lightweight concrete, or the like, or a construction material such as a gypsum board. The ceiling opening 83 capable of accommodating the housing 10 is drilled through the ceiling board 81, and the projector 1 is inserted through the ceiling opening 83 from the ceiling surface 82 side. In this installation state, the pair of mounting springs 21 act so as to push the ceiling opening 83 outward, and the mounting springs 21 and the ceiling board 81 are engaged together. With the elasticity of the mounting spring 21, the housing 10 is held and fixed to the ceiling board 81 so as not to fall through the ceiling opening 83. Moreover, the housing 10 remains in a space on the upper side of the ceiling board 81 in the installation state, and the exterior panel 11 is exposed on the ceiling surface 82 side, that is, in the room space. The projector 1 installed in the ceiling as described above projects an image toward the room space.

In the installation state of FIG. 3, the housing 10 is fixed to the ceiling surface 82. In this state, the inclination angle of the lens barrel 62 with respect to the ceiling surface 82 is adjusted by operation of the inclination adjustment screw 25 (FIG. 1), and thus a direction in which the projector 1 projects light can be adjusted. Moreover, the projection section 70 is rotated around the optical axis of the lens barrel 62 with respect to the ceiling surface 82 by operation of the rotation adjustment screw 27 (FIG. 1), and thus the orientation of the projection image of the projector 1 can be adjusted.

Figure 4:
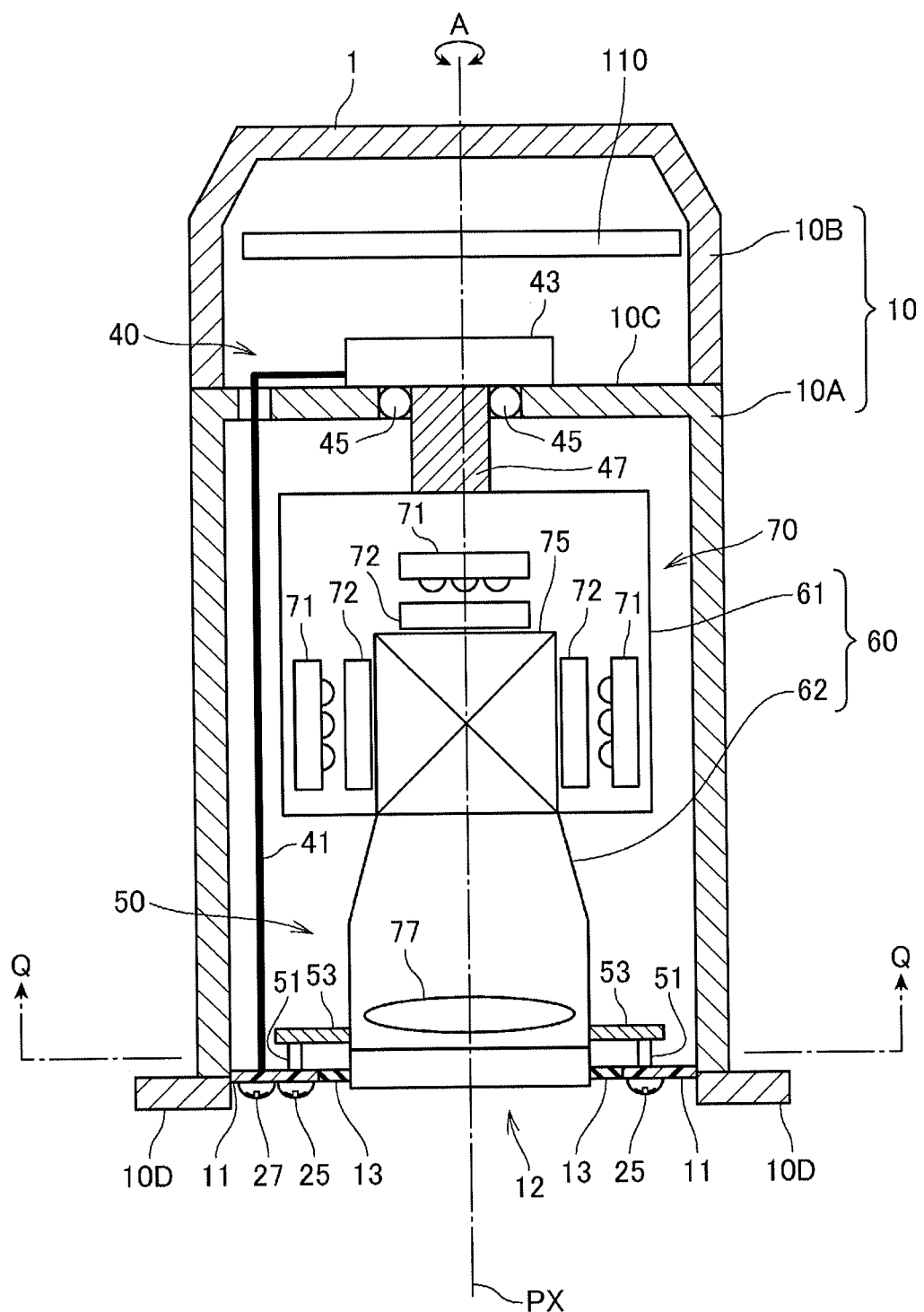
FIG. 4 is a longitudinal cross-sectional view of the projector.

FIG. 4 is a longitudinal cross-sectional view of the projector 1. The mounting springs 21 are not shown in FIG. 4.

The housing 10 is formed of a base housing 10A and an end housing 10B integrated together. The base housing 10A is opened, and the exterior panel 11 is fixed in the opening. A projection section case 61 and the lens barrel 62 are accommodated within the base housing 10A. The projection section case 61 accommodates solid-state light sources 71, liquid crystal light valves 72, and a prism 75. The lens barrel 62 accommodates a projection lens 77. The solid-state light sources 71, the liquid crystal light valves 72, the prism 75, and the projection lens 77 constitute the projection section 70.

The solid-state light source 71 is formed of light emitting diodes (LEDs), laser diodes (LDs), or organic electro-luminescent (EL) light emitting elements that are arranged. The projection section 70 includes three solid-state light sources 71 emitting respective color lights of red (R), green (G), and blue (B). Each of the solid-state light sources 71 may include a color filter or a phosphor. Moreover, each of the solid-state light sources 71 may include a diffuser or the like that diffuses light emitted by the light emitting element.

The liquid crystal light valve 72 is a transmissive liquid crystal panel that modulates the light emitted by the solid-state light source 71 to generate image light. The projection section 70 includes three liquid crystal light valves 72 modulating the respective color lights of red (R), green (G), and blue (B).

The prism 75 combines the image lights modulated by the liquid crystal light valves 72 and emits the combined image light toward the projection lens 77.

The projection lens 77 is installed on the exterior panel 11 side within the lens barrel 62, and projects the image light emitted by the prism 75 while diffusing or converging the image light.

In FIG. 4, the optical axis of the projection section main body 60, that is, the optical axis of the lens barrel 62 (the projection lens 77) is indicated by reference sign PX. In the embodiment, the optical axis PX is substantially perpendicular to the ceiling surface 82.

The solid-state light sources 71, the liquid crystal light valves 72, and the prism 75 are fixed to the projection section case 61. The projection section case 61 is, for example, a hollow box-shaped case, and includes an opening that corresponds to the optical path through which the prism 75 allows the light to be emitted to the projection lens 77. The projection lens 77 is fixed to the lens barrel 62. The lens barrel 62 is a hollow tube and fixed to the projection section case 61.

The projection section main body 60 is supported to the base housing 10A via an elastic body 47 (support section). The elastic body 47 is fixed to the end of the projection section case 61 on the side opposite to the exterior panel 11. The elastic body 47 is an elastic rod-like or columnar member formed of rubber, synthetic rubber, synthetic resin, or a composite material of these materials. The elastic body 47 preferably has a relatively weak elastic force, and may be formed of a coil spring.

The elastic body 47 penetrates through a hole drilled through a flange section 10C that constitutes the upper surface of the base housing 10A, and is supported by a rotation section 43. The elastic body 47 abuts the hole of the flange section 10C via a support ring 45. The elastic body 47 is located on the optical axis PX.

The rotation section 43 is fixed to the flange section 10C. The rotation section 43 includes a gear (not shown), to which the elastic body 47 is fixed. When the gear of the rotation section 43 rotates, the projection section main body 60 rotationally moves about the optical axis PX in a direction indicated by reference sign A in the drawing.

The rotation adjustment screw 27 is coupled to the rotation section 43 via a link 41. When the rotation adjustment screw 27 rotates, this rotation is transferred to the gear of the rotation section 43 through the link 41. Accordingly, when an operation to rotate the rotation adjustment screw 27 is performed, the projection section main body 60 rotationally moves around the optical axis PX in response to this operation. The direction of rotation of the projection section main body 60 is determined by a direction in which the rotation adjustment screw 27 rotates. As a configuration for transferring the rotation of the rotation adjustment screw 27 to the rotation section 43, it is possible to employ, for example, a configuration in which a rod-like link 41 that rotates together with the rotation adjustment screw 27 is used and the rotation section 43 includes a bevel gear that is coupled to the link 41 and a worm gear that is engaged with the bevel gear to rotate the elastic body 47. Alternatively, the rotation section 43 may be configured to include a speed reducing mechanism.

According to this configuration, the projection section main body 60 is rotated by an operation to rotate the rotation adjustment screw 27, and thus the image projected by the projector 1 can be rotated about the optical axis PX. With this configuration, after the projector 1 is installed, that is, after the projector 1 is fixed to the ceiling board 81 or the like, the orientation of the image can be adjusted.

The rotation adjustment screw 27, the link 41, the rotation section 43, the support ring 45, and the elastic body 47 constitute a rotation adjustment mechanism 40 (adjustment mechanism).

It is sufficient that the support ring 45 rotatably supports the elastic body 47 with respect to the flange section 10C so that an excessive load is not applied to the gear of the rotation section 43, and the support ring 45 may be formed of, for example, a bearing, in addition to a ring-shaped member.

A plurality of adjustment cams 53 are disposed around the lens barrel 62. The adjustment cam 53 is a plate cam that is mounted on a shaft 51 coupled to the inclination adjustment screw 25. The adjustment cam 53 abuts the side surface of the lens barrel 62 to displace the lens barrel 62. The shaft 51 may be formed integrally with the inclination adjustment screw 25 or may be coupled to the inclination adjustment screw 25. The shaft 51 perpendicularly protrudes from the exterior panel 11 to the interior space side of the housing 10, and is rotatably supported to the exterior panel 11. The shaft 51 and the adjustment cam 53 constitute the inclination adjustment mechanism 50 (adjustment mechanism).

Figure 5:
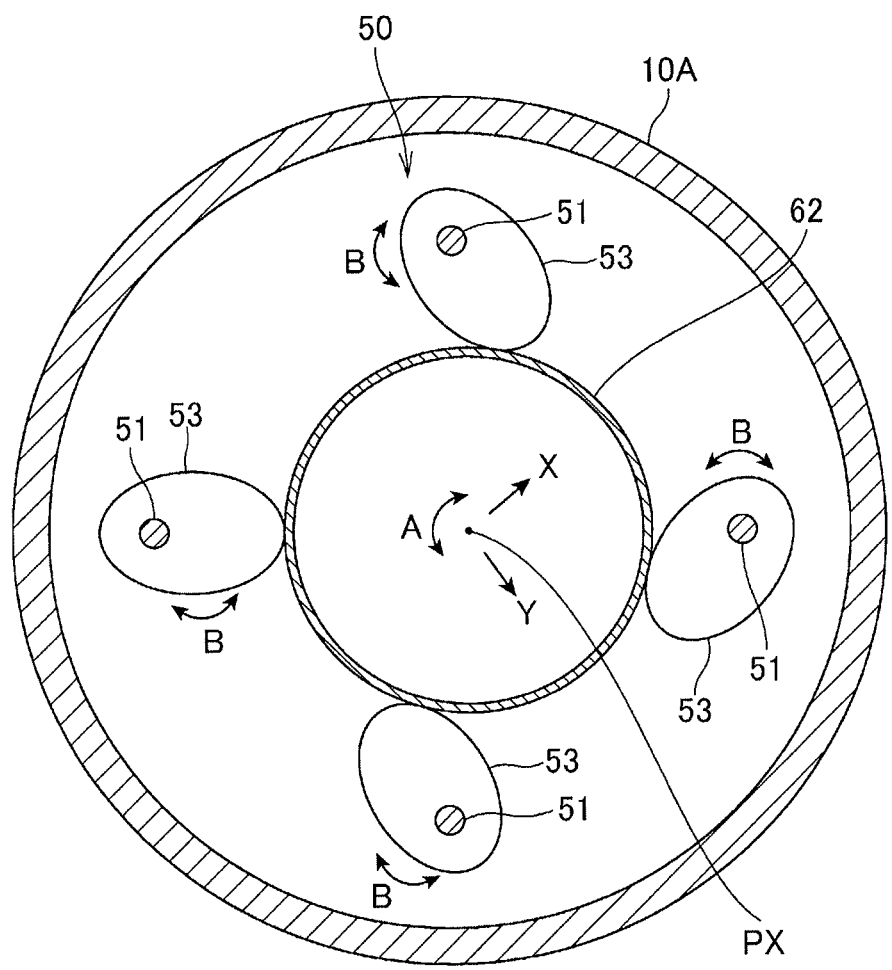
FIG. 5 is a cross-sectional view of the projector along line Q-Q of FIG. 4.

FIG. 5 is a transverse cross-sectional view of the projector 1 along line Q-Q of FIG. 4.

The adjustment cam 53 of the embodiment has an elliptical shape in a plan view as shown in FIG. 5. The shape of the adjustment cam 53 is not limited to an elliptical shape, and the adjustment cam 53 may be circular or may have other shapes. The shaft 51 is fixed at an eccentric position on the adjustment cam 53. The adjustment cam 53 is located between the outer surface of the lens barrel 62 and the inner surface of the base housing 10A, and fixed to the shaft 51. For this reason, when the shaft 51 rotates, the adjustment cam 53 rotates with the shaft 51 being as the axis of rotation.

The position of the shaft 51 on the adjustment cam 53 and the size of the adjustment cam 53 are arbitrary. The adjustment cam 53 may be configured such that the adjustment cam 53 cannot completely rotate in a space between the lens barrel 62 and the base housing 10A. That is, it is sufficient that at least the adjustment cam 53 can rotate by a predetermined angle, and the adjustment cam 53 may be configured such that the adjustment cam 53 cannot make one revolution.

The adjustment cam 53 may be a hard plate formed of metal, synthetic resin, or wood, but may have elasticity. For example, the adjustment cam 53 can be formed of rubber, synthetic rubber, synthetic resin, or a composite material of these materials.

As has been described with reference to FIG. 4, the projection section main body 60 is supported to the base housing 10A via the elastic body 47, and the plurality of adjustment cams 53 may abut the projection section main body 60. For this reason, the lens barrel 62 can move in any direction including an X-direction component and a Y-direction component in FIG. 5, that is, in a direction perpendicular to the optical axis PX, within the allowable range of the elastic force of the elastic body 47. In other words, since the optical axis PX is perpendicular to the ceiling surface 82, the lens barrel 62 moves in a direction parallel to the ceiling surface 82.

The position of the lens barrel 62 is regulated by the adjustment cam 53. Since the shaft 51 is located at an eccentric position on the adjustment cam 53, the rotation of the shaft 51 causes the peripheral surface of the adjustment cam 53 to come close to the lens barrel 62 side or move away from the lens barrel 62. It is also possible to rotate the shaft 51 in the state where the adjustment cam 53 abuts the outer surface of the lens barrel 62, and to press the lens barrel 62. Since the adjustment cam 53 is supported to the base housing 10A via the exterior panel 11, the pressing force of the adjustment cam 53 for pressing the lens barrel 62 acts from the base housing 10A to the lens barrel 62. Accordingly, the lens barrel 62 can move to a position where the lens barrel 62 abuts each of the adjustment cams 53 due to the elasticity of the elastic body 47. In other words, the lens barrel 62 can be moved to any position by rotating the adjustment cam 53. Although FIG. 5 shows an example in which four adjustment cams 53 are disposed, the lens barrel 62 can be moved to any position in a plane of FIG. 5 as long as the projector 1 includes at least three adjustment cams 53.

As described above, the four adjustment cams 53 press the end of the lens barrel 62 close to the exterior panel 11 to thereby move the lens barrel 62. The end of the lens barrel 62 on the side away from the exterior panel 11 is fixed to the projection section case 61, and the projection section case 61 is supported by the elastic body 47. Therefore, the lens barrel 62 is inclined due to the rotation of the adjustment cam 53. For this reason, the inclination of the optical axis PX (FIG. 4) can be adjusted by the adjustment cam 53. Although FIG. 5 shows the state where all of the adjustment cams 53 abut the lens barrel 62, not all of the adjustment cams 53 do not need to abut the lens barrel 62. It is sufficient that only the adjustment cam 53 required to position the optical axis PX at a desired inclination abuts the lens barrel 62.

In the projector 1 as described above, the inclination of the optical axis PX of the projection section main body 60, that is, the projection direction of image light can be adjusted by rotating the inclination adjustment screw 25, and the orientation of an image can be adjusted about the optical axis PX by rotating the rotation adjustment screw 27. These adjustments can be made in the state where the projector 1 is fixed to the ceiling board 81 as shown in FIG. 3.

As shown in FIG. 4, the end housing 10B fixed to the base housing 10A is hollow and accommodates a control board 110. Parts of a control system that executes control of the projector 1 and image processing of the projector 1 are mounted on the control board 110.

Although not shown in FIG. 4, the projector 1 includes connection lines that connect the control board 110 with the solid-state light source 71 and the liquid crystal light valve 72, and a power source line for supplying power from an external power source to the control board 110. The connection line can be formed of an electric wire or a flexible cable, and the power source line can be formed of, for example, a power cable. These wires are laid by appropriately providing holes for cables in the base housing 10A and the end housing 10B.

Figure 6:
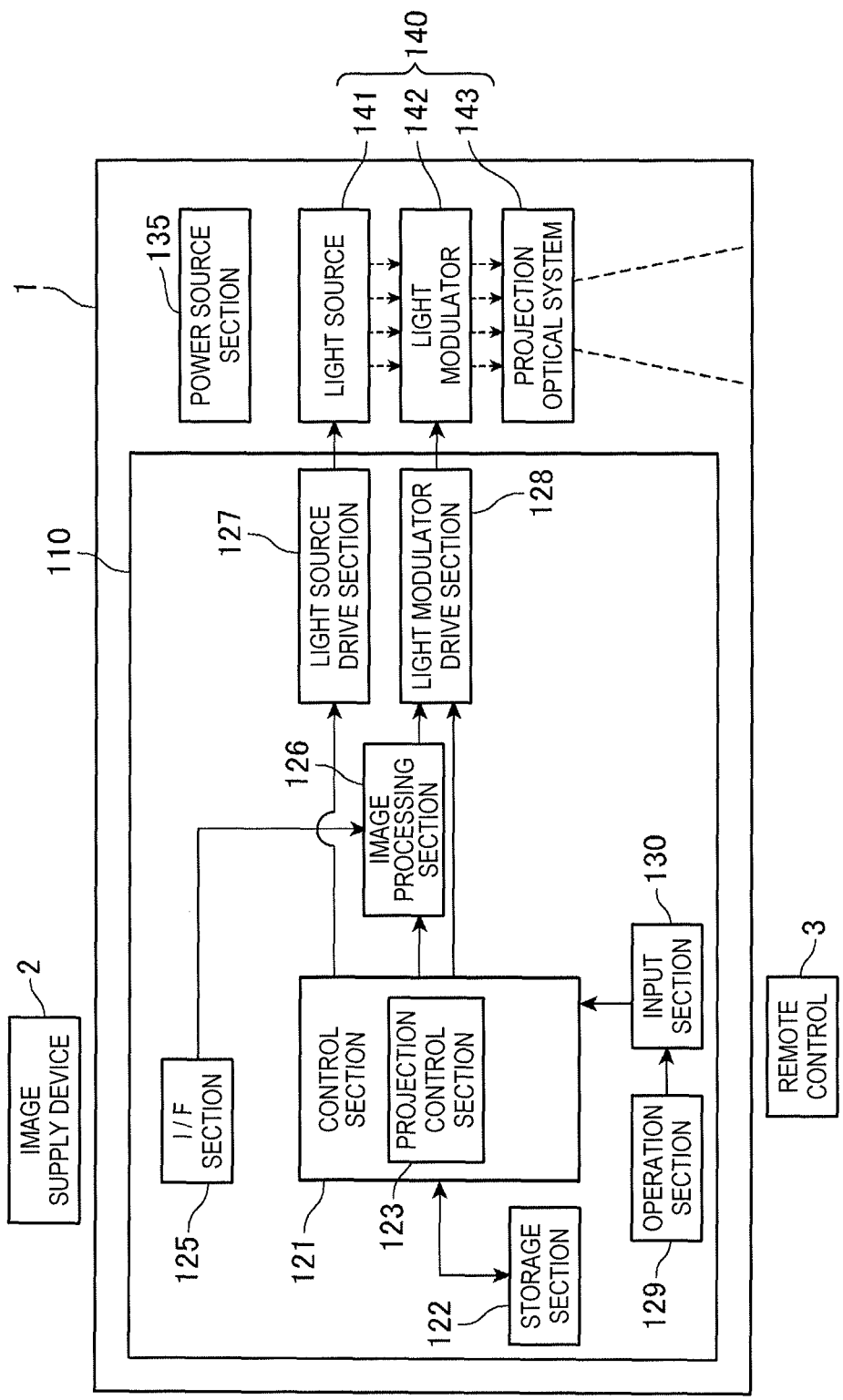
FIG. 6 is a functional block diagram of a control system of the projector.

FIG. 6 is a block diagram showing the configuration of the control system of the projector 1. A remote control 3 is also shown in FIG. 6. The remote control 3 can be understood as constituting a portion of the projector 1. Moreover, the remote control 3 can be thought as a device separate from the projector 1, in which case it is also conceivable that the projector 1 and the remote control 3 constitute a projection system.

The projector 1 includes the projection section 70 described above and a power source section 135. The power source section 135 is connected to an external commercial AC power source, generates a predetermined DC voltage, and supplies the predetermined DC voltage to each part of the control board 110. The power source section 135 may be integrally provided within the housing 10. However, the power source section 135 may be disposed outside the housing 10, and power may be supplied to the main body of the projector 1 via a cable. When the power source section 135 is configured as a separate member as described above, the weight of the main body of the projector 1 can be reduced and thus a load applied to the ceiling board 81 can be reduced.

The projection section 70 includes a light source 141, a light modulator 142 that modulates light emitted by the light source 141 to generate image light, and a projection optical system 143 that projects the image light modulated by the light modulator 142 to form a projection image. The solid-state light source 71 shown in FIG. 4 corresponds to one configuration example of the light source 141. In addition to the solid-state light source 71, the light source 141 may be formed of a lamp such as a halogen lamp, a xenon lamp, or an extra-high-pressure mercury lamp. Moreover, the light source 141 may include a separation optical system that separates light emitted by a single light source into respective color lights of red (R), green (G), and blue (B). The light source 141 is turned on by power supplied from a light source drive section 127 to be described later, and emits light toward the light modulator 142.

The light modulator 142 modulates the light emitted by the light source 141 to generate image light, and radiates the image light to the projection optical system 143. The liquid crystal light valve 72 shown in FIG. 4 corresponds to one configuration example of the light modulator 142. In addition to a transmissive liquid crystal panel such as the liquid crystal light valve 72, the light modulator 142 can be formed of a light modulation element such as a reflective liquid crystal light valve or a digital mirror device (DMD). A light modulator drive section 128 to be described later is connected to the light modulation element of the light modulator 142. The light modulator drive section 128 drives, based on an image signal output by an image processing section 126, the light modulation element to set the gray scales of pixels, and draws an image on the light modulation element in a frame (screen) unit.

The projection optical system 143 includes a lens or a mirror, and projects the image light modulated by the light modulator 142 while diffusing or converging the image light. The projection lens 77 shown in FIG. 4 is one configuration example of the projection optical system 143. With the projection optical system 143, the projector 1 can form an image on a wall surface, a floor surface, or a screen. The projection optical system 143 is not limited to a single lens or mirror, but may include a lens group formed of a plurality of lenses. Moreover, the projection optical system 143 may include a zoom lens and a focus lens.

The projector 1 includes an interface (I/F) section 125 for connecting an image supply device 2 that outputs image data. Examples of the image supply device 2 include, for example, an image reproducing device such as a DVD player, a broadcast receiving device such as a digital television tuner, and an image output device such as s video game console or a personal computer. The image supply device 2 may be a communication device or the like that communicates with a personal computer or the like to receive image data.

The interface section 125 can be configured to execute wireless data communication conforming to a wireless communication standard such as a wireless LAN (WiFi (registered trademark)), Miracast (registered trademark), or Bluetooth (registered trademark) between the image supply device 2 and the interface section 125. Moreover, the interface section 125 may be configured to be wire-connected to the image supply device 2, in which case the interface section 125 includes a connector and an interface circuit. Moreover, the interface section 125 may include a connector and an interface circuit capable of connecting a portable storage medium such as a card-type recording medium including a secure digital (SD) memory card, or a USB memory device.

The projector 1 includes a control section 121 that controls each part of the projector 1. The control section 121 controls each part of the projector 1 to thereby display (project) an image based on the image data input to the interface section 125 with the projection section 70.

The image processing section 126, which processes image data and outputs an image signal for display to the projection section 70, is connected to the interface section 125. The image processing section 126 obtains the image data input from the image supply device 2 to the interface section 125, and executes image processing on the obtained image data. Moreover, when a portable storage medium is connected to the interface section 125, the image processing section 126 may read and obtain image data from this storage medium and process the image data in the same manner as the image data input from the image supply device 2.

The control section 121 includes, for example, a CPU, a ROM, and a RAM (all not shown), and executes programs stored in the ROM or a storage section 122 to be described later with the CPU to thereby control each part of the projector 1.

The storage section 122, the image processing section 126, the light source drive section 127, the light modulator drive section 128, and an input section 130 are connected to the control section 121. The control section 121 includes a projection control section 123 as a functional block that controls these sections. The projection control section 123 is a functional block that is realized by execution of the programs by the CPU of the control section 121 through cooperation of software and hardware.

The storage section 122 is formed of a non-volatile memory device such as a flash memory, and stores data to be processed by the control section 121 or the programs to be executed by the CPU of the control section 121. The storage section 122 may store image data to be projected by the projector 1.

The image processing section 126 is connected to the interface section 125 and obtains image data input to the interface section 125. Under the control of the control section 121, the image processing section 126 performs various kinds of processing on the obtained image data. For example, the image processing section 126 executes resolution conversion processing for converting the resolution of image data to the display resolution of the light modulator 142. Moreover, the image processing section 126 executes geometric correction processing for correcting the shape of image data, color-tone correction processing for correcting the color tone of image data, or the like. The image processing section 126 generates an image signal for displaying the processed image data and outputs the image signal to the light modulator drive section 128.

When the storage section 122 stores image data, the image processing section 126 may perform the above image processing on the image data stored by the storage section 122. In this case, the control section 121 reads the image data from the storage section 122 and outputs the image data to the image processing section 126. The image processing section 126 performs the processing on the image data, and outputs the image signal to the light modulator drive section 128.

The light source drive section 127 supplies a drive current or a pulse to the light source 141 and causes the light source 141 to emit light. The light source drive section 127 may be capable of adjusting the emission luminance of the light source 141.

Under the control of the control section 121, the light modulator drive section 128 drives the light modulator 142 based on the image signal input from the image processing section 126, and draws an image on the light modulator 142 in a frame unit.

The projection control section 123 executes control relating to the projection of an image by the projection section 70. The projection control section 123 controls the execution timing at which the image processing section 126 executes processing, execution conditions, and the like. The projection control section 123 controls the light source drive section 127 to make, for example, an adjustment of the luminance of the light source 141. Moreover, the projection control section 123 controls processing for drawing an image on the light modulator 142 by the light modulator drive section 128.

The control section 121 is connected to the input section 130 (operation detecting section) accepting a user's input operation. The input section 130 is configured as an infrared ray receiving section that receives an infrared ray signal transmitted by the remote control 3, and detects an operation at the remote control 3. The input section 130 outputs operation data representing operations at an operation section 129 and the remote control 3 to the control section 121.

When the projection control section 123 detects instructions to project an image based on the operation data input from the input section 130, the projection control section 123 executes projection based on the image data input to the interface section 125 or the image data stored by the storage section 122. When the projection control section 123 detects instructions to terminate projection based on the operation data input from the input section 130, the projection control section 123 terminates projection. The operation section 129 including an operation switch may be connected to the input section 130. If such a configuration is employed, various kinds of adjustments can be made by operation of the operation switch in, for example, installing the projector 1 in a ceiling.

As has been described above, the projector 1 according to the first embodiment to which the invention is applied is attached to the ceiling opening 83 provided in the ceiling surface 82, and projects an image to one side with respect to the ceiling surface 82. The projector 1 includes the exterior panel 11 exposed on the one side, the projection section 70 projecting image light from the projection port 12 formed in the exterior panel 11 to the one side, and the rotation adjustment mechanism 40 and the inclination adjustment mechanism 50 adjusting a posture of the projection section 70 with respect to the ceiling surface 82. With this configuration, since the posture of the projection section 70 with respect to the ceiling surface 82 can be adjusted in the state where the projector 1 is attached to the ceiling surface 82, the projection state of the projector 1 can be adjusted after the installation of the projector 1. Specifically, a direction in which the projector 1 projects light, or the orientation of an image can be adjusted.

The rotation adjustment mechanism 40 has a feature to rotate the projection section 70 with an axis perpendicular to the ceiling surface 82 being as the axis of rotation. With this configuration, the orientation of the image projected by the projector 1 can be adjusted by rotating the projection section 70 with respect to the ceiling surface 82 after the installation of the projector 1.

The rotation adjustment mechanism 40 includes the elastic body 47 supporting the projection section 70 with respect to the base housing 10A to which the exterior panel 11 is fixed, and the rotation section 43 rotating the elastic body 47 around the optical axis PX of the projection section 70. Since the rotation section 43 rotates the elastic body 47, the projection section 70 can be rotated around the optical axis PX. Accordingly, the orientation of the image projected by the projector 1 can be adjusted after the installation of the projector 1.

The inclination adjustment mechanism 50 adjusts the inclination of the projection section 70 with respect to the ceiling surface 82. For this reason, the direction in which the projector 1 projects light, that is, a position where the image is displayed can be adjusted by adjusting the inclination of the projection section 70 with respect to the ceiling surface 82 after the installation of the projector 1.

The inclination adjustment mechanism 50 displaces the end of the projection section 70 on the exterior panel 11 side in a direction perpendicular to the optical axis PX to thereby change the inclination of the optical axis PX of the projection section 70. For this reason, the direction in which the projector 1 projects light, that is, the position where the image is displayed can be adjusted by adjusting the inclination of the projection section 70 after the installation of the projector 1.

The projector 1 includes the inclination adjustment screw 25 and/or the rotation adjustment screw 27 on the exterior panel 11. The rotation adjustment mechanism 40 and/or the inclination adjustment mechanism 50 are/is coupled to the inclination adjustment screw 25 and/or the rotation adjustment screw 27. The rotation adjustment mechanism 40 or the inclination adjustment mechanism 50 adjusts the posture of the projection section 70 with respect to the ceiling surface 82 by an operation on the inclination adjustment screw 25 or the rotation adjustment screw 27. For this reason, the direction in which the projector 1 projects light, or the orientation of the image can be adjusted by operating the inclination adjustment screw 25 and/or the rotation adjustment screw 27 provided on the exterior panel 11, after the installation of the projector 1.

The projector 1 includes the cover 15 covering up the inclination adjustment screw 25 and the rotation adjustment screw 27. The cover 15 includes the cover opening 14 through which the image light projected by the projection section 70 passes, and exposes the lens barrel 62 through the cover opening 14. For this reason, an improvement in aesthetic appearance can be achieved by covering the inclination adjustment screw 25 and the rotation adjustment screw 27 with the cover 15, and the inclination adjustment screw 25 or the rotation adjustment screw 27 can be prevented from being unintentionally moved. A transparent or transmissive film or plate that covers the lens barrel 62 may be provided without providing the cover opening 14 in the cover 15. In this case, the film or plate corresponds to a transmission section.

Second Embodiment

Figure 7:
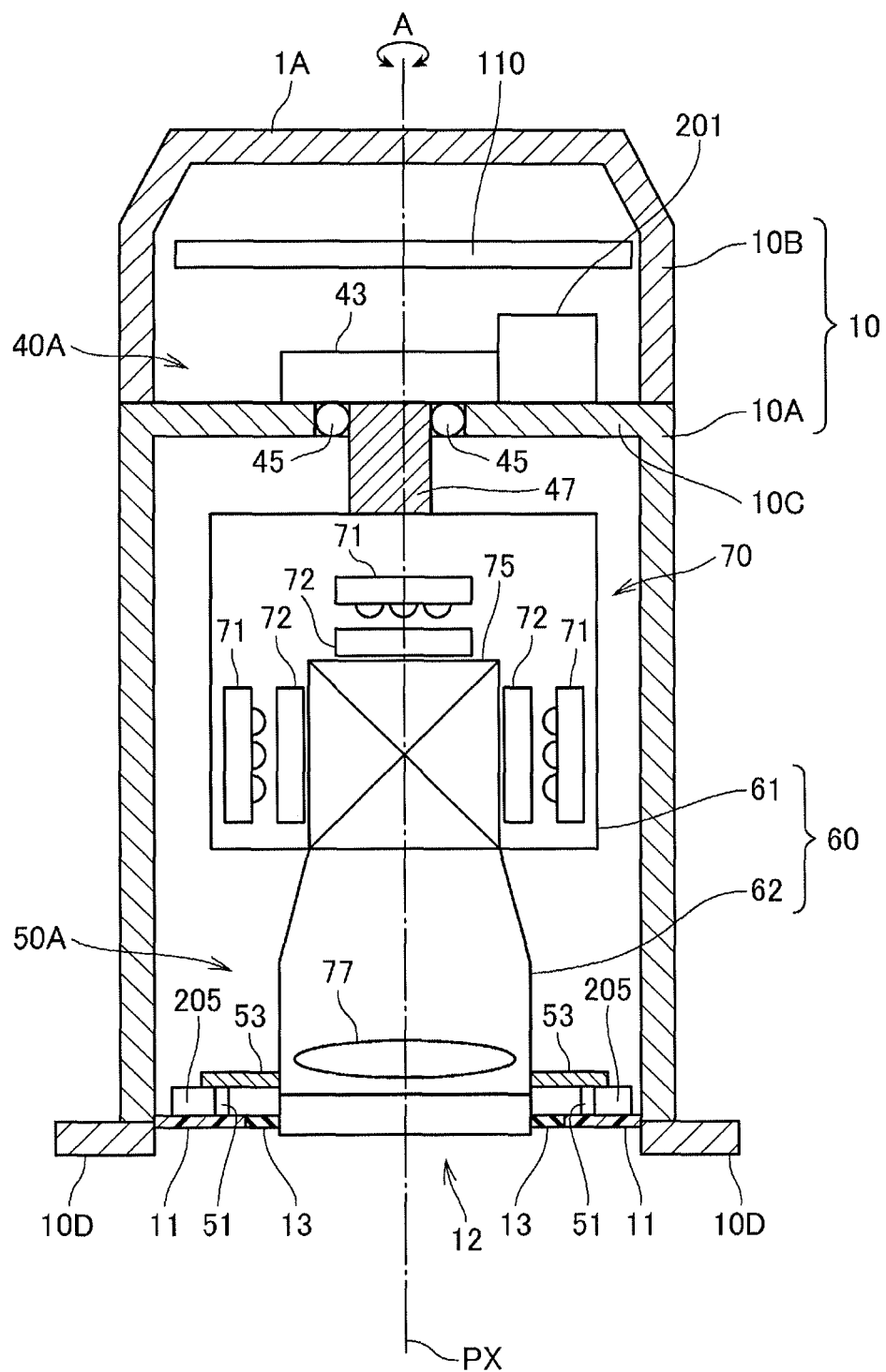
FIG. 7 is a longitudinal cross-sectional view of a projector according to a second embodiment.

FIG. 7 is a longitudinal cross-sectional view showing the configuration of a projector 1A according to a second embodiment to which the invention is applied. In the embodiment, configurations common to the projector 1 described in the first embodiment are denoted by the same reference numerals and signs in the drawing, and the description of the configurations is omitted.

The projector 1A includes a rotation adjustment mechanism 40A (adjustment mechanism) instead of the rotation adjustment mechanism 40 included in the projector 1, and includes an inclination adjustment mechanism 50A (adjustment mechanism) instead of the inclination adjustment mechanism 50.

The rotation adjustment mechanism 40A has a configuration obtained by excluding the rotation adjustment screw 27 and the link 41 of the rotation adjustment mechanism 40 and coupling a motor 201 (drive section) to the rotation section 43. As shown in FIG. 7, the motor 201 is fixed to the flange section 10C and coupled to the gear within the rotation section 43. The gear of the rotation section 43 is rotated by the rotational motion of the motor 201, and thus the elastic body 47 can be rotationally moved. The drive shaft of the motor 201 may be directly coupled to the elastic body 47 without the rotation section 43, and the elastic body 47 may be rotated by a direct-drive method.

The inclination adjustment mechanism 50A has a configuration obtained by excluding the inclination adjustment screw 25 of the inclination adjustment mechanism 50 and coupling a motor 205 (drive section) to the shaft 51. The motor 205 may be fixed on the rear surface side of the exterior panel 11, that is, on the inner side of the base housing 10A. Moreover, the motor 205 may be provided corresponding to each of the four shafts 51.

The output shaft of the motor 205 is coupled to the shaft 51 via a gear or link (not shown). The shaft 51 is rotated by the rotational motion of the motor 205, and thus the adjustment cam 53 can be rotated. The drive shaft of the motor 205 may be directly coupled to the adjustment cam 53 without the gear or link, and the adjustment cam 53 may be rotated by a direct-drive method.

Since the inclination adjustment screw 25 and the rotation adjustment screw 27 are absent in the projector 1A, there is no need to provide the cover 15 for hiding these screws. However, it is of course possible to dispose the cover 15.

Figure 8:
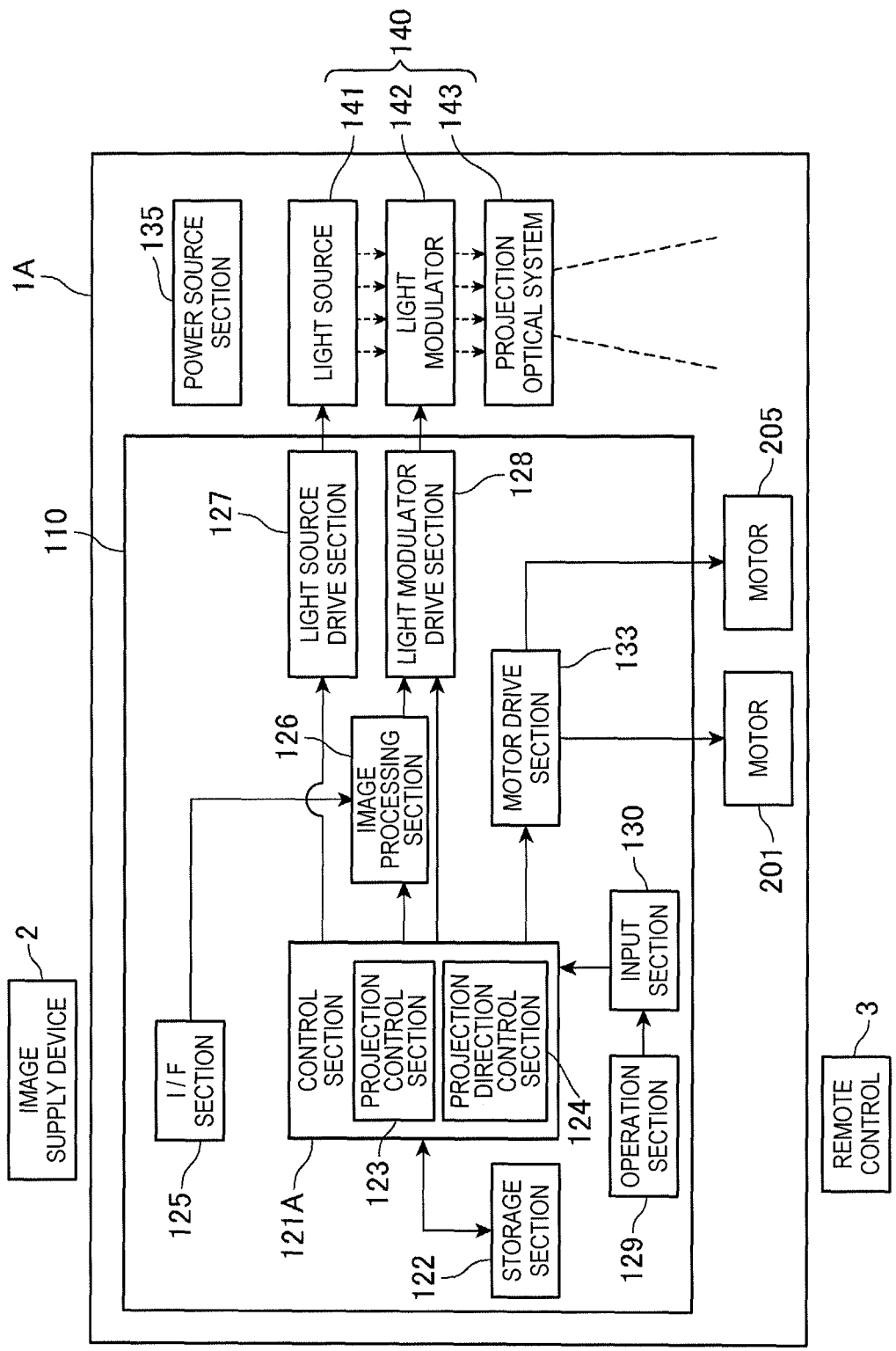
FIG. 8 is a functional block diagram of a control system of the projector according to the second embodiment.

FIG. 8 is a functional block diagram of a control system of the projector 1A.

In the projector 1A, a motor drive section 133 is mounted on the control board 110. A control section 121A (control section) includes a projection direction control section 124 in addition to the functions of the control section 121 (FIG. 6). The projection direction control section 124 is a functional block that is realized by execution of programs by the CPU of the control section 121A through cooperation of software and hardware.

When the projection direction control section 124 detects, based on operation data output by the input section 130, an operation to instruct the adjustment of the projection direction of the projection section 70 through operation of the remote control 3, the projection direction control section 124 controls the motor drive section 133. The motor drive section 133 outputs a drive current and/or a drive pulse to the motor 201 and the motor 205. The motor drive section 133 may include, for example, a configuration for detecting the rotational positions of the motors 201 and 205. Specifically, the motors 201 and 205 may be servomotors each including a rotary encoder that detects the rotational position. When the motors 201 and 205 are each formed of a stepping motor, the configuration for detecting the rotational position is unnecessary.

At the remote control 3 (operation device), an input operation is possible with respect to the direction of image light projected by the projector 1A, and the direction of rotation of the image light. For example, the remote control 3 includes a cross key or direction keys indicating four directions, and the direction of the image light (projection light) of the projector 1A or the adjustment of rotation angle is instructed by using these keys.

The input section 130 receives an infrared ray signal transmitted by the remote control 3, and detects the operation of the cross key or direction key at the remote control 3 through decoding of the infrared ray signal. The input section 130 outputs operation data corresponding to the operated key to the control section 121A.

The projection direction control section 124 calculates, based on the operation data output by the input section 130, motion parameters of the rotation adjustment mechanism 40A and the inclination adjustment mechanism 50A based on the kind, direction, and number of times of operation of the key operated at the remote control 3. The motion parameter includes, for example, the amount and direction of rotation of the rotation adjustment mechanism 40A rotated by the rotation section 43 around the optical axis PX. Moreover, the projection direction control section 124 may calculate, based on the amount and direction of rotation of the rotation section 43, the direction and amount of rotation of the motor 201, and the obtained direction and amount of rotation of the motor 201 may be used as motion parameters.

Moreover, the motion parameter may include a direction in which the inclination adjustment mechanism 50A moves the lens barrel 62, and the amount of movement. Moreover, the projection direction control section 124 may calculate the direction and amount of rotation of each of the four motors 205, and the obtained direction and amount of rotation of each of the motors 205 may be used as motion parameters.

As a typical motion example, in a mode to instruct the rotation of the image light projected by the projector 1A, the projection direction control section 124 calculates the amount of rotation of the motor 201 corresponding to one operation every time the cross key or direction key of the remote control 3 is operated once. The direction of rotation of the motor 201 in this case is determined corresponding to the kind of the key (e.g., the direction of the key) operated at the remote control 3. Moreover, a configuration may be employed in which, for example, setting data representing the direction and amount of rotation of the motor 201 corresponding to one operation is previously stored in the storage section 122 for each of the kinds of the keys of the remote control 3 and the projection direction control section 124 refers to the setting data.

Moreover, as a typical motion example, in a mode to instruct the inclination or direction of the image light projected by the projector 1A, the projection direction control section 124 calculates the amount of rotation of the motor 205 corresponding to one operation every time the cross key or direction key of the remote control 3 is operated once. In this case, a configuration may be employed in which, for example, setting data representing the direction and amount of rotation of each of the four motors 205 corresponding to one operation is previously stored in the storage section 122 for each of the kinds of the keys of the remote control 3. With this configuration, the projection direction control section 124 can determine, based on the setting data of the storage section 122, the amount and direction of rotation of each of the motors 205.

The projection direction control section 124 controls the motor drive section 133 according to the calculated amount and direction of rotation, and causes the motor 201 and the motor 205 to operate. With this configuration, the inclination of the optical axis PX with respect to the housing 10 and the rotational position of the image around the optical axis PX can be adjusted by operation of the remote control 3.

As described above, the projector 1A includes the input section 130 detecting an operation on the remote control 3, and the motors 201 and 205 driving the rotation adjustment mechanism 40A and the inclination adjustment mechanism 50A. Since the control section 121A causes the motors 201 and 205 to operate corresponding to the operation detected by the input section 130, a direction in which the projector 1A projects light, or the orientation of an image can be adjusted by the operation of the remote control 3 after the installation of the projector 1A.

Each of the embodiments described above only shows one aspect of the invention, and any modification and application can be made within the scope of the invention.

For example, in the above embodiments, the remote control 3 is not limited to a device dedicated for use in the projectors 1 and 1A. It is sufficient that the remote control 3 can transmit an operation signal to the projectors 1 and 1A through an infrared ray signal or a wireless signal according to WiFi or Bluetooth. Moreover, in the projectors 1 and 1A, it is sufficient that the input section 130 can receive the signal transmitted by the remote control 3, and the format or physical requirements of the signal can be arbitrarily changed. Accordingly, a configuration may be employed in which, as the remote control 3 for example, a smartphone or tablet-type computer is used. The smartphone or tablet-type computer can be configured to function as the remote control 3 by installing an application program for operating the projectors 1 and 1A. According to this configuration, the smartphone or tablet-type computer for general purposes can be used as the remote control 3. Moreover, it is of course possible to realize a configuration in which the smartphone or tablet-type computer functioning as the remote control 3 also functions as the image supply device 2.

Detailed configurations of the projectors 1 and 1A are arbitrary. For example, an antenna or light receiving section that receives the wireless signal transmitted by the remote control 3 may be disposed on the exterior panel 11.

Although an example in which the projector 1 is installed in the ceiling surface 82 has been shown in the above embodiment, the projectors 1 and 1A can be embedded and installed in a wall surface or a floor surface, and may be embedded and installed in furniture or a utensil. Moreover, the projectors 1 and 1A can be installed outdoors.

Although an aspect in which the three light sources 141 and the three light modulators 142 are used has been shown in the above embodiment, an aspect in which two light sources 141 and two light modulators 142 are used may be employed, or an aspect in which one light source 141 and one light modulator 142 are used without using the prism 75 can also be employed.

Although the projection section 70 is disposed such that the optical axis PX is substantially perpendicular to the ceiling surface 82 in the above embodiment, the invention is not limited to this aspect. For example, it is also possible to employ an aspect in which the optical axis PX is inclined with respect to the ceiling surface 82 so that an image can be projected from the projector 1 installed in a ceiling to a wall surface.

The functional blocks shown in FIGS. 6 and 8 each show a functional configuration that is realized by cooperation of hardware and software, and a specific mounting embodiment is not particularly limited. Accordingly, it is not necessary to mount hardware corresponding to each of the functional blocks, and it is of course possible to employ a configuration in which one processor executes programs to thereby realize the functions of a plurality of functional sections. Moreover, in the above embodiments, a portion of the functions realized by software may be realized by hardware, or a portion of the functions realized by hardware may be realized by software. In addition, specific detailed configurations of other parts of the projectors 1 and 1A can also be arbitrarily changed within the scope not departing from the gist of the invention.

What is claimed is:

1. A projector configured to project an image to one side with respect to a planar installation surface having a first face and a second face opposite of the first face, the projector comprising:
   a housing configured to be fixed to the installation surface;
   a projection section built in the housing and configured to project image light from a first end of the housing, the first end of the housing being configured to extend from the first face of the installation surface;
   an adjustment mechanism configured to adjust a posture of the projection section with respect to the installation surface;
   a drive section configured to drive the adjustment mechanism; and
   an operation detecting section configured to detect an input operation corresponding to the adjustment mechanism, the operation detecting section, the projection section, the adjustment mechanism, and the drive section being configured to extend from the second face of the installation surface.

2. The projector according to claim 1, wherein the adjustment mechanism is configured to cause the drive section to rotate the projection section about a rotational axis perpendicular to the installation surface.

3. The projector according to claim 2, wherein the adjustment mechanism includes:
   a support section configured to support the projection section in the housing, and
   a rotation adjustment mechanism configured to rotate the support section around an optical axis of the projection section.

4. The projector according to claim 1, wherein the adjustment mechanism configured to adjust an inclination of the projection section with respect to the installation surface.

5. The projector according to claim 4, wherein the adjustment mechanism includes an inclination adjustment mechanism configured to cause the drive section to displace a first side of the projection section in a direction perpendicular to an optical axis of the projection section so as to change the inclination of the optical axis of the projection section.

6. The projector according to claim 1, wherein the drive section is coupled to a shaft of an adjustment cam, the adjustment mechanism being configured to adjust the posture of the projection section with respect to the housing by a rotation of the adjustment cam, the adjustment cam abutting a first end of the projection section.

7. The projector according to claim 1, wherein the operation detecting section is configured to receive an infrared ray signal for the input operation, the infrared ray signal being transmitted by an operation device.

8. A projector configured to be integrated with a planar installation surface having a first face and a second face opposite to the first face, the projector comprising:
   a housing including a flange protruding outward from a housing first end;
   a cover disposed on and fixed to the flange, the cover being configured to extend from the first face of the installation surface;
   a projection section built in the housing and configured to project image light from the housing first end;
   an adjustment mechanism configured to adjust a posture of the projection section with respect to the housing;
   a drive section configured to drive the adjustment mechanism;
   an operation detecting section configured to detect an input operation corresponding to the adjustment mechanism; and
   a control board configured to mount the drive section and the operation detecting section, wherein the control board, the projection section, and the adjustment mechanism are configured to extend from the second face of the installation surface.

9. The projector according to claim 8, wherein the cover is formed with a cover opening in a center of the cover such that the image light is projected by the projection section through the cover opening.

10. The projector according to claim 8, wherein the cover includes a transmission section through which the projected image light passes.

* * * * *